United States Patent [19]
Alasia

[11] 3,769,890
[45] Nov. 6, 1973

[54] AUTOSTEREOGRAPHIC APPARATUS
[75] Inventor: Alfred V. Alasia, Whitestone, N.Y.
[73] Assignee: Photogenex Inc., King of Prussia, Pa.
[22] Filed: June 30, 1972
[21] Appl. No.: 268,177

[52] U.S. Cl. ............... 95/18 P, 95/86, 350/130, 352/57, 352/86
[51] Int. Cl. ........................................... G03b 35/08
[58] Field of Search ............... 95/18 P, 86; 352/57, 352/60, 86; 350/130, 131

[56] References Cited
UNITED STATES PATENTS

| | | |
|---|---|---|
| 3,392,648 | 7/1968 | Bartholomew .................. 95/18 P |
| 3,524,395 | 8/1970 | Alasia............................. 95/18 P |
| 3,392,647 | 7/1968 | Bartholomew .................. 95/18 P |

*Primary Examiner*—Richard L. Moses
*Attorney*—Robert J. Schiller et al.

[57] ABSTRACT

Apparatus for use in autostereography for moving the objective lens of a camera and the camera back transverse to a subject along parallel linear paths between extreme positions. The apparatus includes a linkage for moving the lens and back relative to one another during exposure, the back being moved more rapidly than the lens so that the distance traveled by the back between the extreme positions thereof is greater than the distance traveled by the lens. Another linkage is included for pivoting the back about an axis perpendicular to the direction of linear motion and parallel with the plane of a photosensitive element mounted in the back. The back is pivoted through a predetermined angle with respect to the lens during movement of the lens and back between their extreme positions. The spacing between the lens and back is variable for focusing, and the linkages automatically vary the relative movement of the lens and back in inverse relation to the space therebetween while maintaining constant the angle through which the back is pivoted relative to the lens during movement of the lens and back between their extreme positions.

17 Claims, 6 Drawing Figures

3,769,890

AUTOSTEREOGRAPHIC APPARATUS

The present invention is concerned with autostereography and particularly with apparatus for moving the objective lens of a camera and the back of a camera relative to a subject and to one another to produce a parallax panoramagram.

Autostereoscopic photographs in the form of parallax panoramagrams are produced utilizing a camera having a conventional objective lens, preferably corrected to have a flat focal plane, and during the period of exposure, moving the lens relative to the subject in a generally horizontal direction linearly and at a right angle to the optical axis of the lens. This movement causes a continuously changing aspect of the subject to be presented to the camera lens. A photosensitive element is positioned at the focal plane of the lens. A graticule, in the form of a grid comprising narrow, substantially vertical and parallel opaque strips separated by narrower transparent strips or, preferably, a lenticular screen comprising substantially vertical contiguous cylindrical lenticules, is located between the lens and the photosensitive element closely adjacent the latter. During exposure, the graticule and film are moved together relative to the lens to expose successive portions of the photosensitive elements underlying the graticule. It has been the practice during exposure to move the camera lens from an initial position through an intermediate position to a terminal position, and to move the camera back simultaneously and along a parallel path at a faster rate than the lens, such that a light ray from a point near the center of the subject or scene being photographed, passing through the nodal point of the lens, is always incident upon a graticule at the same point. However, due to the spacing between the graticule and photosensitive element, the ray will fall upon the photosensitive element at progressively different points as the camera lens and back are moved, so that different aspects of the subject are presented to the lens and recorded by the photosensitive element.

Autostereographic methods of the type described have necessitated moving the camera lens and back through relatively large distances so that heretofore, parallax panoramagram cameras have been so large and bulky as to make them extremely difficult to transport, and have required exposure periods of such extended duration as to render them unsuitable for photographing subjects that cannot be held stationary during long exposures. These factors coupled with the difficulty of setting up and preparing such apparatus for use and the need for substantial power to operate such cameras, have effectively limited their use almost exclusively to the studio while precluding their employment in the field.

An object of the invention is to provide novel and improved autostereographic apparatus of the type described for moving a camera lens and back relative to one another to produce parallax panoramagrams, which apparatus is readily and easily portable, requires exposure periods of shorter duration that hitherto has been necessary, and is adapted to use in the field.

Other objects of the invention are: to provide autostereographic apparatus as described in which the linear travel of the camera lens and back are reduced by pivoting the back through an angle with respect to the lens during travel of the lens and back; and to provide apparatus as described characterized by a relatively simple, inexpensive and light-weight structure adapted for use over a range of camera-to-subject distances and designed to automatically vary the travel of the lens, of the back, and pivotal motion of the latter to compensate for changes in the focus of the camera. Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention reference may be had to the following detailed description taken in connection with the accompanying drawings wherein FIG. 1 is a perspective view of apparatus embodying the invention for moving a camera lens and camera back relative to one another to produce parallax panoramagrams;

Figure 1:
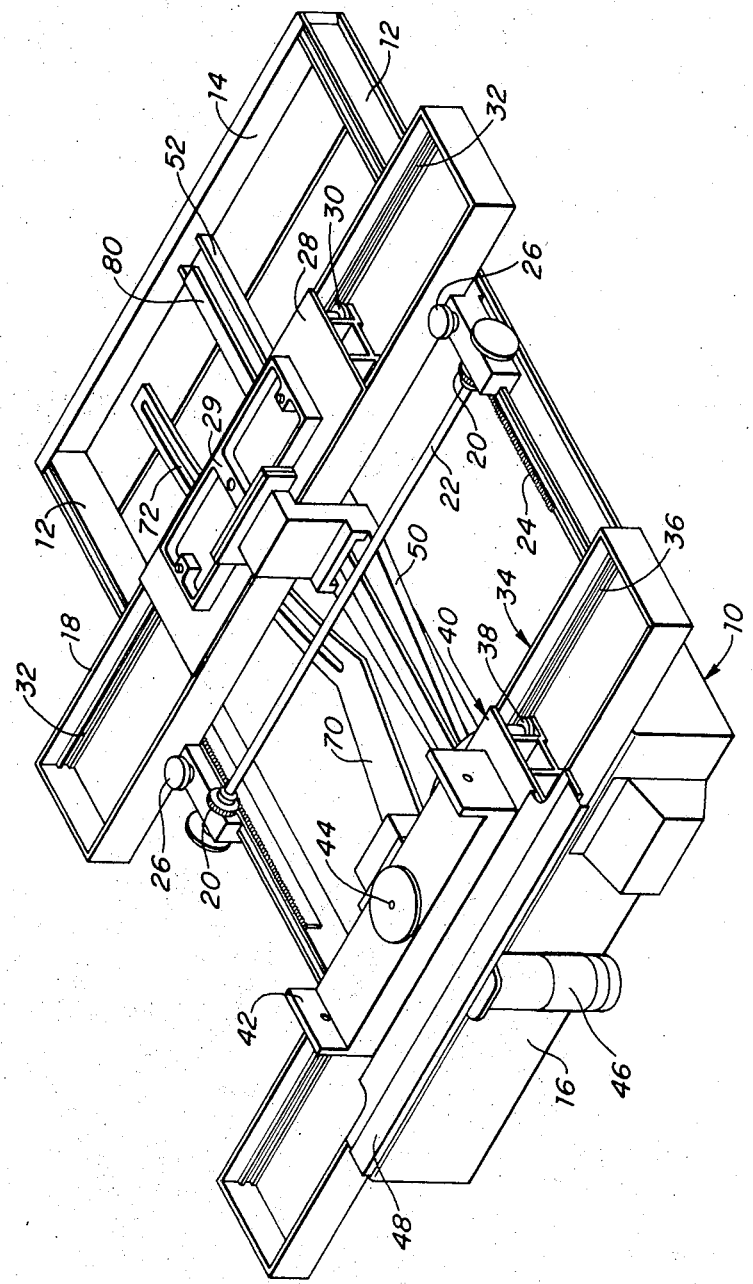
Figure 2:
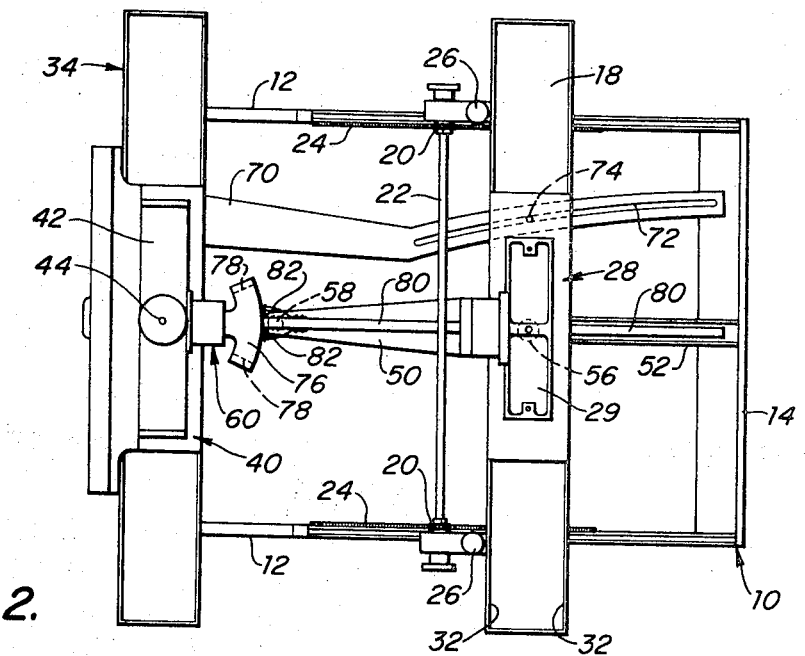
FIGS. 2 and 3 are, respectively, top and bottom plan views of the apparatus of FIG. 1.

The apparatus of the invention is designed to mount and manipulate the essential components of a conventional camera so as to produce parallax panoramagrams. Such a camera customarily includes a lens board on which are mounted an objective lens, preferably corrected to have a flat focal plane, and a shutter associated with the lens and an independent camera back for holding and supporting a photosensitive, image-recording element in a plane. A flexible, extensible bellows is coupled between the lens board and camera back to provide a light-tight chamber between the lens board and back while permitting omnidirectional movement of the lens and back relative to one another. In conventional photography under ordinary circumstances, the camera lens and back are supported in substantially fixed relation with the optic axis of the lens disposed perpendicular to the plane of the photosensitive element mounted for exposure in the camera back and intersecting the photosensitive element (usually rectangular) at the geometric center thereof. The lens and camera back are held stationary with respect to the subject and to one another during exposure. In autostereographic processes employing the same essential components of the camera, a graticule i.e. lenticular screen or grating, is mounted adjacent the photosensitive element between the latter and the lens, and the lens and camara back are moved relative to one another and the subject during exposure.

Reference is now made to FIGS. 1 through 4 of the drawings wherein there is shown apparatus embodying the invention for supporting a camera lens board and a camera back, coupled to one another by a bellows, in position to make photographic exposures. Means are provided for moving the lens and camera back relative to one another and to a subject so as to produce parallax panoramagrams. The apparatus comprises a rectangular frame 10 for supporting the operative components of the apparatus and adapted to be mounted on a support such as a conventional tripod. Frame 10 includes two parallel side members 12 joined at their ends to a forward transverse member 14 and a rear transverse member 16. The frame is formed of a rigid, lightweight material such as aluminum or magnesium. The side members are preferably in the form of channels so as to achieve a combination of maximum strength with minimum weight and to provide rails for movably mounting components of the apparatus.

As previously noted, in autosterographic apparatus the camera lens and back are moved, during exposures, horizontally along a linear paths relative to the subject and perpendicular to the optic axis of the lens. In addition, the lens and camera back are mounted for relative movement parallel with the lens axis in order to focus the lens over a range of camera-to-subject distances. In the apparatus of the invention, means are provided for mounting the camera lens board for transverse linear motion relative to the subject and for linear motion along the lens axis relative to the camera back and frame 10. In the form shown, these means include a channel 18 mounted on side members 12 for sliding movement perpendicularly to the length of the channel and parallel with the side members. Pinions 20 are provided mounted on a common shaft 22 on channel 18 in engagement with racks 24 on side members 12 and are adapted to be rotated to move channel 18 forwardly and rearwardly along the side members to focus a camera lens mounted on the channel. Locking screws with knurled knobs 26 are provided on the channel and can be tightened in engagement with the side members to retain the channel in fixed position. A forward carriage 28 including support 29 designed to mount a conventional camera lens board is mounted in channel 18 for linear motion in a direction perpendicular to the direction of movement of the channel. For this purpose, carriage 28 includes wheels 30 engaged with tracks on the sides of channel 18.

The means for mounting the camera back for linear movement along a path parallel with the path of movement of the lens includes a channel 34 mounted in fixed position above transverse member 16 and including tracks 36 for supporting and guiding the wheels 38 or rear carriage 40. Support 42, designed to mount a conventional camera back with the photosensitive element located in a plane, is mounted on carriage 40 for rotation about pivot 44. The latter has an axis perpendicular to the paths of linear movement of the carriages 28 and 40 and channel 18, and perferably substantially coincident with the plane of a photosensitive element supported for exposure in a camera back mounted on support 42.

In autostereographic processes of the type performed by the apparatus of the invention, during exposure, the lens is moved linearly and horizontally relative to the subject in order to present changing aspects of the subject to the lens. Motion of the lens is perpendicular to the optic axis of the lens and is from an extreme or terminal position to another extreme or terminal position through an intermediate position halfway between the extreme positions. Simultaneously with movement of the lens, the camera back holding a photosensitive element at the focal plane of the lens and a graticule in front of the photosensitive element, is moved parallel with the lens and in the same direction through a greater distance from an extreme position through an intermediate or medial position to another extreme position. The camera back is moved at a faster rate than the lens such that an imaginary line from a point preferably near the center of interest of the subject and coincident with the optic axis of the lens at least when the lens is in its intermediate or (medial position), always intersects the graticule at the same point during exposure and movement of the lens and camera back.

In the apparatus of the invention, a first of the carriages 28 and 40 is driven along a linear path defined by the appropriate one of channels 18 and 34 on which the driven carriage is mounted, while a linkage, shown in FIGS. 1 through 5, functions to move the other carriage along its linear path relative to the first carriage. Although either carriage may be driven, in the preferred form shown, the rear carriage 40, mounting the camera back, is driven; and the forward carriage 28 mounting the camera lens is moved by the linkage through a shorter distance relative to the subject and rear carriage. As noted above, the rear carriage mounting the camera back is moved at a faster rate and through a greater distance than the forward carriage mounting the camera lens, so as to maintain a predetermined relationship between the subject, lens and camera back. This relationship is required to be maintained despite changes in the camera-to-subject distance, and changes made in the spacing between the camera lens and camera back in order to focus the camera. The linkage of the invention automatically compensates for changes in the spacing between the carriages by moving the carriages through relative distances and at relative speeds that are an inverse function of the spacing between the carriages. In other words, the distance between the extreme positions of the forward carriage 28 mounting the lens is least when the spacing between the carriages is greatest, and the proportion between the linear speeds of the carriages is smallest.

The means for moving the carriages include electric motor 46 mounted on rear transverse member 16 for driving a pinion (not shown) engaged with rack 48 mounted on rear carriage 40. The linkage for moving forward carriage 28 in response to movement of rear carriage 40 includes fixed arm 50 mounted on forward carriage 28, extending rearwardly towards rear carriage 40, and an elongated link 52 in the form of a channel having a U-shaped cross section, pivotally connected at one end to carriage 40. Link 52 extends forwardly beneath channel 18 where it is supported by support bar 54 on the underside of channel 18 in engagement with a follower roller 56 mounted for rotation on the underside of channel 52 and engaged between the sides of U-shaped link 52. A second follower roller 58 is mounted for rotation on the end of arm 50 and is also engaged between the sides of U-shaped link 52. By virtue of this arrangement, link 52 is pivoted with respect to and about fixed follower roller 56 on channel 18 by and in response to linear movement of rear carriage 40, in turn, moving follower roller 58 and forward carriage 28 in the same direction as the rear carriage by virtue of engagement of follower roller 58 on arm 50 between the sides of U-shaped link 52. The distance through which forward carriage 28 is moved relative to rear carriage 40 is a function of the angle through which link 52 is pivoted in engagement with follower roller 58 and the spacing between roller 58 and the point at which the link is pivotally connected to carriage 40. The angle and spacing are, in turn, a function of the spacing between channels 18 and 34 on which the carriages are mounted. Thus the simple structure shown automatically adjusts the travel of the carriages for changes in the distance between the carriages.

Figure 6:
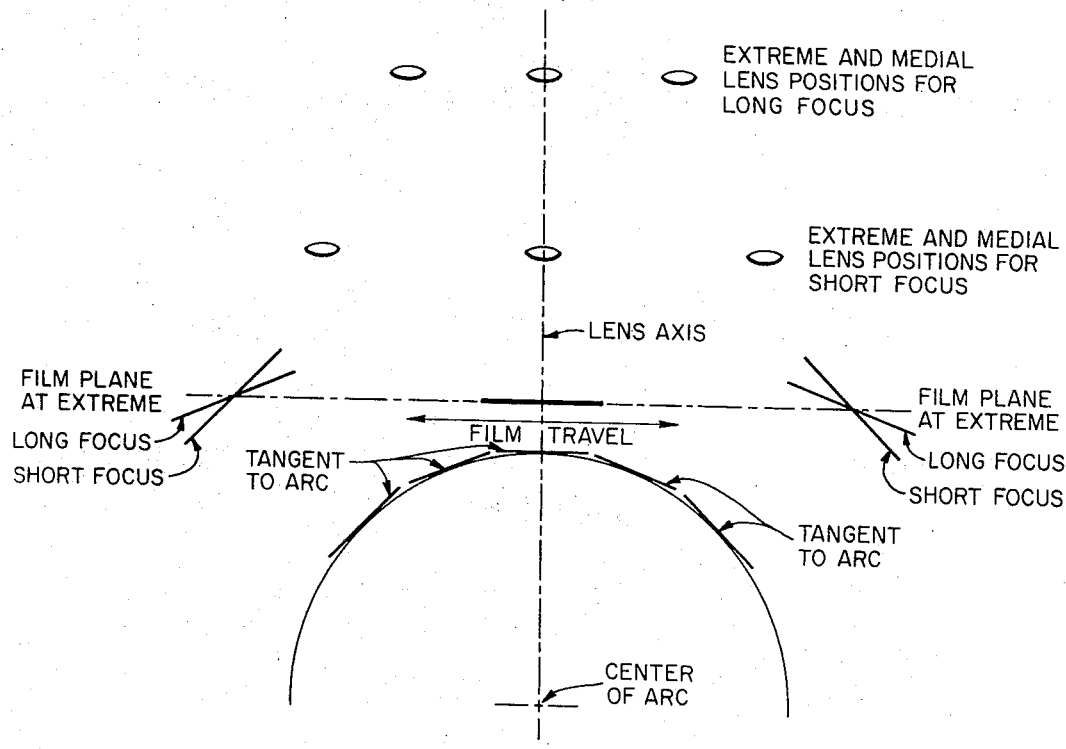
FIG. 6 is a diagram illustrating the operation of the apparatus.
Figure 4:
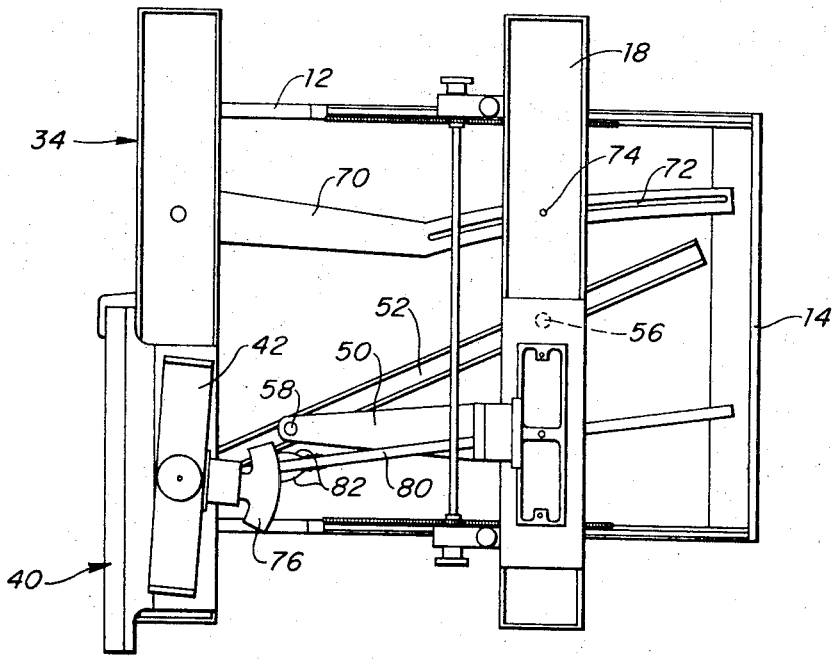
FIG. 4 is another view showing the elements of FIG. 2 in another position.
Figure 5:
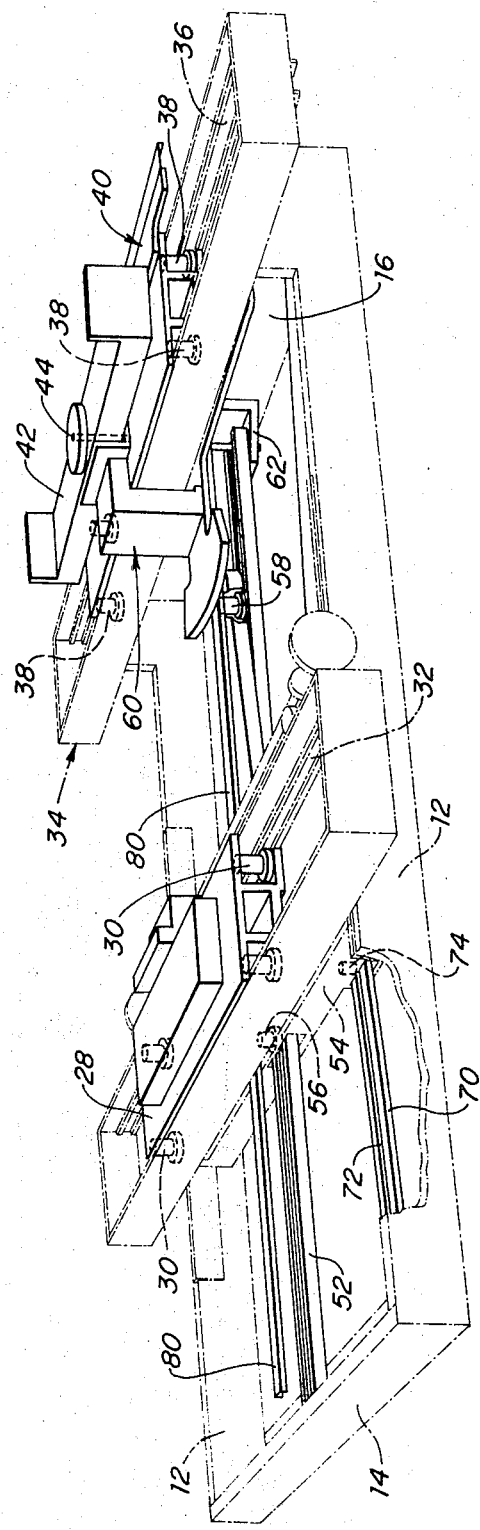
FIG. 5 is a perspective view of components of the apparatus.

It has been found that the autostereographic effect is enhanced and the distances traveled by the carriages can be reduced substantially in turn resulting in a comparable reduction in overall size and weight of the apparatus and the duration of exposures, by pivoting the support means for the camera back. As illustrated in FIG. 6, pivotal motion of the support means is preferably about a vertical axis through the plane of a photosensitive recording medium, such that the plane of the recording medium is always parallel with a line tangent to an imaginary arc having a center located behind the recording medium, i.e. to the side thereof opposite the lens. For a particular combination of objective lens and graticule, at all relative positions of the lens and graticule, the support means for the camera back (and thus the recording medium and graticule) is always pivoted through the same angle with respect to the objective lens during travel of the lens and camera back between the extreme positions thereof. The total angle through which the film plane is pivoted with respect to the lens during movement of the lens and film between their extreme positions may be of the order of 22° for a typical lens and graticule combination. FIG. 6 should be considered only as illustrative, particularly as the relative distances traveled and the angle through which the film plane is pivoted are exaggerated for purposes of clarity of illustration.

The apparatus of the invention comprises means including a linkage shown in FIGS. 1 through 5, for automatically pivoting camera back support 42 with respect to rear carriage 40 during and in response to movement of the carriage. These means include crank member 60 attached to or formed integrally with support 42 and pivotally mounted coaxially with support 42 on carriage 40. Crank member 60 includes an arm 62 to which link 52 is pivotally connected and an extended follower arm 64 having a follower roller 66 mounted for rotation on the end thereof. Follower roller 66 is engaged in the groove or channel of cam link 68 having a U-shaped cross section and being mounted for pivotal movement intermediate its ends on the underside of channel 34. A cam lever 70 is provided mounted at one end on channel 34 for pivotal movement coaxially with cam link 68. The latter and cam lever 70 are fixedly coupled to one another so as to pivot as a unit. Cam link 68 is linear and is mounted at an angle with respect to the linear path of travel of carriage 40 so that follower roller 66, engaged in the channel or groove in cam link 68, is moved forwardly or rearwardly during movement of the carriage, in turn pivoting follower arm 68 of crank member 60 and camera back support 42 attached thereto.

Figure 3:
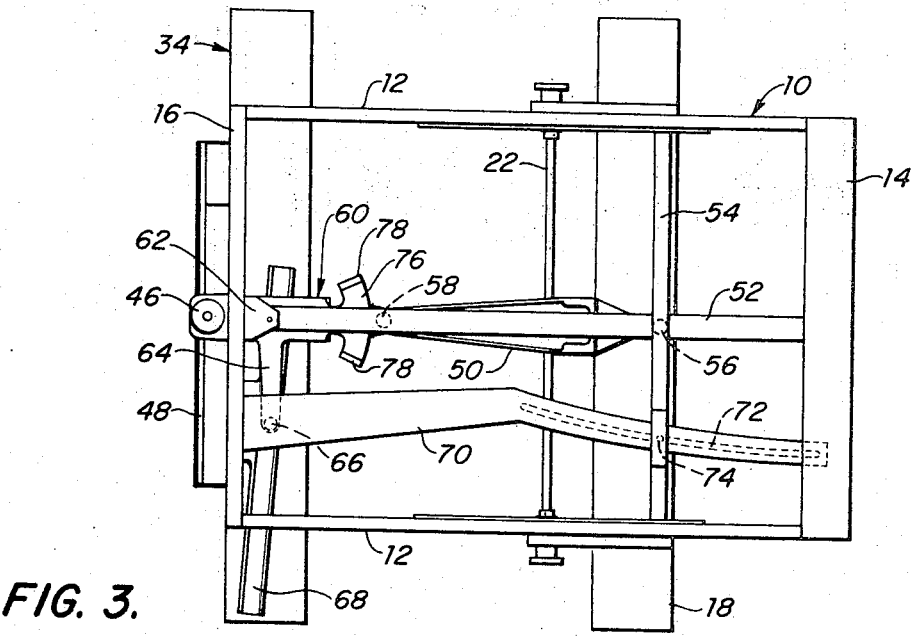

The angle through which the camera back support is rotated depends upon the angle between linear cam link 68 and the direction of linear travel of rear carriage 40. The linkage, best shown in FIG. 3, is designed to automatically adjust this angle as the spacing between the carriages is altered to focus the lens and thereby to maintain constant the angle through which the camera back support 42 is pivoted with respect to the lens during movement of the carriages between their extreme positions. To perform this function, cam lever 70 is provided with a curved cam groove 72 engaged with follower roller 74 which is mounted for rotation on the underside of channel 18. Cam lever 72 is supported in engagement with follower roller 74 by support bar 54 so that lever 70 is pivoted, in turn pivoting cam link 68, by and in response to the movement of channel 18 toward and away from channel 34.

Movement of the carriages during exposure is also controlled by the linkage which pivots the camera back support. To perform this function, crank member 60 is provided with an arcuate shaped switch arm 76 for mounting a pair of normally closed limit switches 78 as shown particularly in FIGS. 2 and 3. Switches 78 are connected in series between motor 46 and a source of electric current for energizing the motor. Operation of the switches serves to terminate the operation of the motor and the travel of the carriages when the carriages have reached an extreme position. Switches 78 are designed to be actuated (opened) by engagement with a bar or lever 80 mounted on forward carriage 28 for movement with the carriage in the path of arcuate motion of switches 78 mounted on switch arm 76. A pair of cantilever spings 82 are mounted on the sides of bar 80 for engaging and actuating the switches 78. This arrangement permits relative motion of the carriages for focusing in turn resulting in arcuate motion of the switches. The cantilever springs also prevent damage to the switches resulting from over travel of bar 80 and the carriages during focusing adjustment and due to the inertia of the carriages and the camera components mounted thereon.

Lever 80 is constructed and mounted so that the sides thereof are parallel with a vertical plane through the optic axis of a lens supported on forward carriage 28. Thus by virtue of this construction, the angle through which switches 78 move along an arcuate path about pivot 44 during movement of the carriages, defines the angle through which support 42 and the photosensitive element are pivoted relative to the objective lens.

The controls for the apparatus to initiate an exposure cycle may include a manually operated switch or switches for bypassing the switch 78 which was opened to terminate the previous exposure cycle. Closing of the manual, bypass switch causes the carriage to move at least sufficiently to permit the open limit switch 78 to close. With both limit switches 78 closed, the carriages will continue to move without interruption until they reach the opposite extremities of their travel as determined by the opening of one of the limit switches 78. Switches 78 may also be coupled in a circuit for controlling the operation of a shutter associated with the camera lens so as to initiate an exposure at the beginning of motion of the carriages and terminate the exposure when movement of the carriages is terminated.

It will be appreciated from the foregoing that applicant has succeeded in developing a novel, lightweight structure including simple linkages comprising relatively few components. The apparatus is capable of automatically moving the lens board and back of a camera relative to one another at different speeds while pivoting the camera back to a predetermined angle relative to the lens. This easily assembled and inexpensive structure offers the further advantage of permitting variation in the spacing between the camera lens and back to focus the camera and automatically altering the linear and rotary motions of the lens and back to compensate for changes in the spacing.

Since certain changes may be in the above apparatus without departing from the scope of the invention herein involved, it is intended that all matter contained in the above description or shown in the accompanying drawings shall be interpreted as illustrative and not in a limiting sense.

I claim:

1. Autostereographic apparatus comprising, in combination:
   a first carriage;
   support means mounted for pivotal movement on said first carriage for supporting a graticule and an associated photosensitive element;
   a second carriage including means for mounting an objective lens in position to transmit light toward a graticule and photosensitive element supported on said first carriage;
   means mounting said carriages for linear motion along parallel paths substantially perpendicular to the pivotal axis of said support means and the optic axis of a lens supported on said second carriage;
   a first linkage coupled between said carriages for moving one of said carriages along said path thereof between two extreme positions thereof in the same direction as the other of said carriages and relative to said other carriage in response to and simultaneously with movement of said other carriage between extreme positions thereof;
   said first linkage including means for causing said second carriage to move relative to said means mounting said carriages, at a slower rate than said first carriage; and
   a second linkage coupled with said support means for pivoting the latter during and in response to movement of said first carriage.

2. Autostereographic apparatus as defined in claim 1 including means for varying the spacing between said paths of linear motion of said carriages and wherein said first linkage includes means for varying the distance between said extreme positions of said carriages in inverse relation to the spacing between said paths of movement of said carriages.

3. Autostereographic apparatus as defined in claim 2 where said second linkage includes means coupled with said means for mounting said carriages for pivoting said support means through a substantially constant predetermined angle relative to a lens mounted on said second carriage.

4. Autostereographic apparatus as defined in claim 3 wherein the last-mentioned means include means for varying the angle through which said support means are pivoted relative to said second carriage in inverse relation to the spacing between the paths of motion of said carriages to maintain said predetermined angle constant.

5. Autostereographic apparatus as defined in claim 1 including drive means for moving said first carriage along said path thereof and wherein said first linkage includes a drive link coupled between said first carriage and said means for mounting said second carriage, for engaging and moving a member of said second carriage in response to motion of said first carriage.

6. Autostereographic apparatus as defined in claim 5 wherein said means for mounting said second carriage include a support for said second carriage movable perpendicularly to said paths of motion of said carriages for changing the spacing between said paths, and said drive link is movably couple with said support for said second carriage.

7. Autostereographic apparatus as defined in claim 1 including control means responsive to pivotal motion of said support means through a predetermined angle relative to said second carriage, for terminating the motion of said carriages at said extreme positions thereof.

8. Autostereographic apparatus as defined in claim 7 including drive means for moving said one carriage along said path thereof and wherein said control means include a control member mounted on said second carriage and means coupled with said drive means and responsive to engagement with said control member, for terminating the operation of said drive means, the last-mentioned means being mounted on said support means for movement therewith along an arcuate path intersected by said control member.

9. Autostereographic apparatus as defined in claim 8 wherein said drive means include an electric motor and said last-mentioned means include a pair of switches having actuating elements adapted to be engaged by said control member mounted on said support means a predetermined angular distance apart along said arcuate path.

10. Autostereographic apparatus as defined in claim 1 wherein said second linkage includes means for pivoting said support means such that a planar photosensitive element mounted thereon is always disposed parallel with a line tangent with an arc having its center located to the side of said support means opposite said second carriage.

11. Autostereographic apparatus as defined in claim 10 including means for varying the spacing between said paths of linear motion of said carriages and wherein said second linkage includes means coupled with the last mentioned means for varying the radius of said arc in direct relation to the spacing between said paths.

12. Autostereographic apparatus as defined in claim 11 wherein said second linkage includes means, coupled with said means for mounting said carriages, for pivoting said support means through a predetermined angle relative to said second carriage during movement of said carriages said initial and terminal positions and maintaining said angle constant while said spacing between said paths of motion of said carriages is changed.

13. Autostereographic apparatus as defined in claim 10 including means for moving said first carriage along said path thereof and wherein said first linkage includes a drive link coupled between said first carriage and said means for mounting said second carriage, for engaging and moving a member on said second carriage in response to motion of said first carriage.

14. Autostereographic apparatus as defined in claim 13 wherein said means for mounting said second carriage include a support for said second carriage movable perpendicularly to said paths of motion of said carriages for changing the spacing between said paths, and said drive link is movably coupled with said support for said second carriage.

15. Autostereographic apparatus as defined in claim 10 including control means responsive to pivotal motion of said support means through a predetermined angle relative to the optic axis of a lens mounted on said second carriage for terminating the motion of said carriages at said extremem positions thereof.

16. Autostereographic apparatus as defined in claim 15 including drive means for moving said one carriage along said path thereof and wherein said control means include a control member mounted on said second carriage and means coupled with said drive means and responsive to engagement with said control member for terminating the operation of said drive means, the last-mentioned means being mounted on said support means for movement therewith along an arcuate path intersected by said control member.

17. Autostereographic apparatus as defined in claim 16 wherein said drive means include an electric motor and said last-mentioned means include a pair of switches connected in circuit with said motor and having actuating elements adapted to be engaged by said control member mounted on said support means a predetermined angular distance apart along said arcuate path in position to be engaged by said control member.

* * * * *